US011659001B2

(12) United States Patent
Wang et al.

(10) Patent No.: US 11,659,001 B2
(45) Date of Patent: May 23, 2023

(54) NON-INTRUSIVE REPLAY ATTACK DETECTION SYSTEM

(71) Applicant: GENERAL ELECTRIC COMPANY, Schenectady, NY (US)

(72) Inventors: Honggang Wang, Clifton Park, NY (US); Masoud Abbaszadeh, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 497 days.

(21) Appl. No.: 16/712,221

(22) Filed: Dec. 12, 2019

(65) Prior Publication Data

US 2021/0185085 A1    Jun. 17, 2021

(51) Int. Cl.
*H04L 9/40* (2022.01)
*G06F 16/2458* (2019.01)
*G06F 16/28* (2019.01)
*G05B 19/418* (2006.01)
*G01K 13/00* (2021.01)
(Continued)

(52) U.S. Cl.
CPC ......... *H04L 63/1466* (2013.01); *G01D 21/02* (2013.01); *G01K 13/00* (2013.01); *G05B 19/41885* (2013.01); *G06F 16/2474* (2019.01); *G06F 16/285* (2019.01); *G06N 3/04* (2013.01); *G05B 2219/32335* (2013.01)

(58) Field of Classification Search
CPC ....................... H04L 63/1466; G05B 19/41885
See application file for complete search history.

(56) References Cited

U.S. PATENT DOCUMENTS

| 6,851,054 B2 | 2/2005 | Wheeler et al. |
| 9,076,019 B2 | 7/2015 | Gueron et al. |
| 2003/0065919 A1 | 4/2003 | Albert et al. |

(Continued)

FOREIGN PATENT DOCUMENTS

WO    WO-2019190403 A1 *  10/2019    ......... H04L 63/0227

OTHER PUBLICATIONS

Tran et al., "Detection of Replay Attacks In Smart Grid Systems", 2013 International Conference on Computing, Management and Telecommunications (ComManTel), pp. 298-302, Ho Chi Minh City, Vietnam, Mar. 21, 2013.
(Continued)

*Primary Examiner* — Esther B. Henderson
(74) *Attorney, Agent, or Firm* — Buckley, Maschoff & Talwalkar LLC

(57) ABSTRACT

In some embodiments, identifying a replay attack in an industrial control system of an industrial asset includes receiving a first set of time series data associated with an ambient condition of one or more first monitoring nodes at a first location of the industrial control system. An actual system feature value for the industrial asset is determined based upon the first set of time series data. A second set of time series data indicative of the ambient condition at a second location is received, and a nominal system feature value is determined based upon the second set of time series data. A correlation between the actual feature value and the nominal system feature value is analyzed to determine a correlation result. A request received by the industrial control system is selectively categorized as a replay attack based upon the correlation result.

20 Claims, 9 Drawing Sheets

(51) Int. Cl.
    *G01D 21/02*     (2006.01)
    *G06N 3/04*     (2023.01)

(56) References Cited

U.S. PATENT DOCUMENTS

| | | | |
|---|---|---|---|
| 2018/0159879 A1* | 6/2018 | Mestha | G06N 3/0454 |
| 2018/0255091 A1 | 9/2018 | Mestha et al. | |
| 2018/0374487 A1 | 12/2018 | Lesso | |
| 2019/0013033 A1 | 1/2019 | Bhimanaik et al. | |
| 2019/0044973 A1 | 2/2019 | Deutsch et al. | |
| 2022/0165008 A1* | 5/2022 | McRaven | G06T 11/206 |

OTHER PUBLICATIONS

Tang et al., "Secure Networked Control Systems Against Replay Attacks Without Injecting Authentication Noise", 2015 American Control Conference (Acc), pp. 6028-6033, Chicago, IL, USA, Jul. 1-3, 2015.

Hao et al., "Modelless Data Quality Improvement Of Streaming Synchrophasor Measurements By Exploiting The Low-Rank Hankel Structure", IEEE Transactions on Power Systems, vol. 33, Issue No. 06, pp. 6966-6977, Nov. 2018.

* cited by examiner

NON-INTRUSIVE REPLAY ATTACK DETECTION SYSTEM

BACKGROUND

Industrial control systems that operate physical systems (e.g., associated with power turbines, jet engines, locomotives, autonomous vehicles, etc.) are increasingly connected to the Internet. As a result, these control systems have been increasingly vulnerable to threats, such as cyber-attacks (e.g., associated with a computer virus, malicious software, etc.) that could disrupt electric power generation and distribution, damage engines, inflict vehicle malfunctions, etc. Replay attacks assume that sensing data associated with a monitor center of physical system is secretly recorded by an attacker, and the sensing data is then replayed by the attacker back to a monitoring center while conducting an attack on the physical system. Because the adversary hijacks all sensors, the temporal and spatial correlation among the hijacked sensors are still maintained during this kind of attack. Therefore, current approaches exploiting these correlations, including subspace projection based approaches (e.g., principle component analysis (PCA) and singular value decomposition (SVD)), or decision boundary based approaches (e.g., pretrained machine learning model) tend to fail to detect the replay attack.

The current predominant replay attack detection approach is to inject a known independently identically distributed (i.i.d.) zero-mean Gaussian noise into the control signal at the plant input that serves as an authentication signal, also called physical watermarking. By injecting a known noisy input to a physical system, it is expected that the effect of this input can be found in the measurement of the true output due to system dynamics. As such, if an attacker is unaware of this physical watermark, the system cannot be adequately emulated because the attacker is unable to consistently generate the component of the output associated with this known noisy input. Consequently, the watermark acts as a physical nonce, forcing an attacker to generate outputs unique to the given inputs at a chosen time. Assuming a linear-quadratic-Gaussian (LQG) control system, an $X^2$ detector can then be used to detect the presence of the replay attack. When the replay attack is present, the normalized error covariance of the innovation signal of the Kalman filter deviates from identity with a higher variance dependent upon the variance of the injected noise. As its variance increases, the detection rate improves but the control performance suffers. There exists a trade-off between the detection rate and loss of the control performance in terms of the variance of the authentication signal. The noise injected at the plant input has to be large enough in order to achieve acceptable detection performance, which deteriorates the control system performance. It would therefore be desirable to provide an approach to replay attack detection of an industrial asset without using watermarking or signal injection.

SUMMARY

According to some embodiments, a method to identify a replay attack in an industrial control system of an industrial asset includes receiving a first set of time series data associated with an ambient condition of one or more first monitoring nodes at a first location of the industrial control system. An actual system feature value for the industrial asset is determined based upon the first set of time series data; receiving a second set of time series data indicative of the ambient condition at a second location. A nominal system feature value is determined based upon the second set of time series data. A correlation between the actual feature value and the nominal system feature value is analyzed to determine a correlation result. A request received by the industrial control system is selectively categorized as a replay attack based upon the correlation result.

According to some embodiments, a system to identify a replay attack in an industrial control system of an industrial asset including one or more first monitoring nodes at a first location of the industrial control system, and an attack detector coupled to the one or more first monitoring nodes. The attack detector is configured to: receive a first set of time series data associated with an ambient condition of one or more first monitoring nodes at a first location of the industrial control system; determine an actual system feature value for the industrial asset based upon the first set of time series data; receive a second set of time series data indicative of the ambient condition at a second location; determine a nominal system feature value based upon the second set of time series data; analyze a correlation between the actual feature value and the nominal system feature value to determine a correlation result; and selectively categorize a request received by the industrial control system as a replay attack based upon the correlation result.

Some technical advantages of some embodiments disclosed herein are improved systems and methods to detect one or more industrial assets from replay cyber-attacks in a non-intrusive manner that does not affect control performance and without needing to inject an authentication signal into the control system.

DETAILED DESCRIPTION

Figure 1:
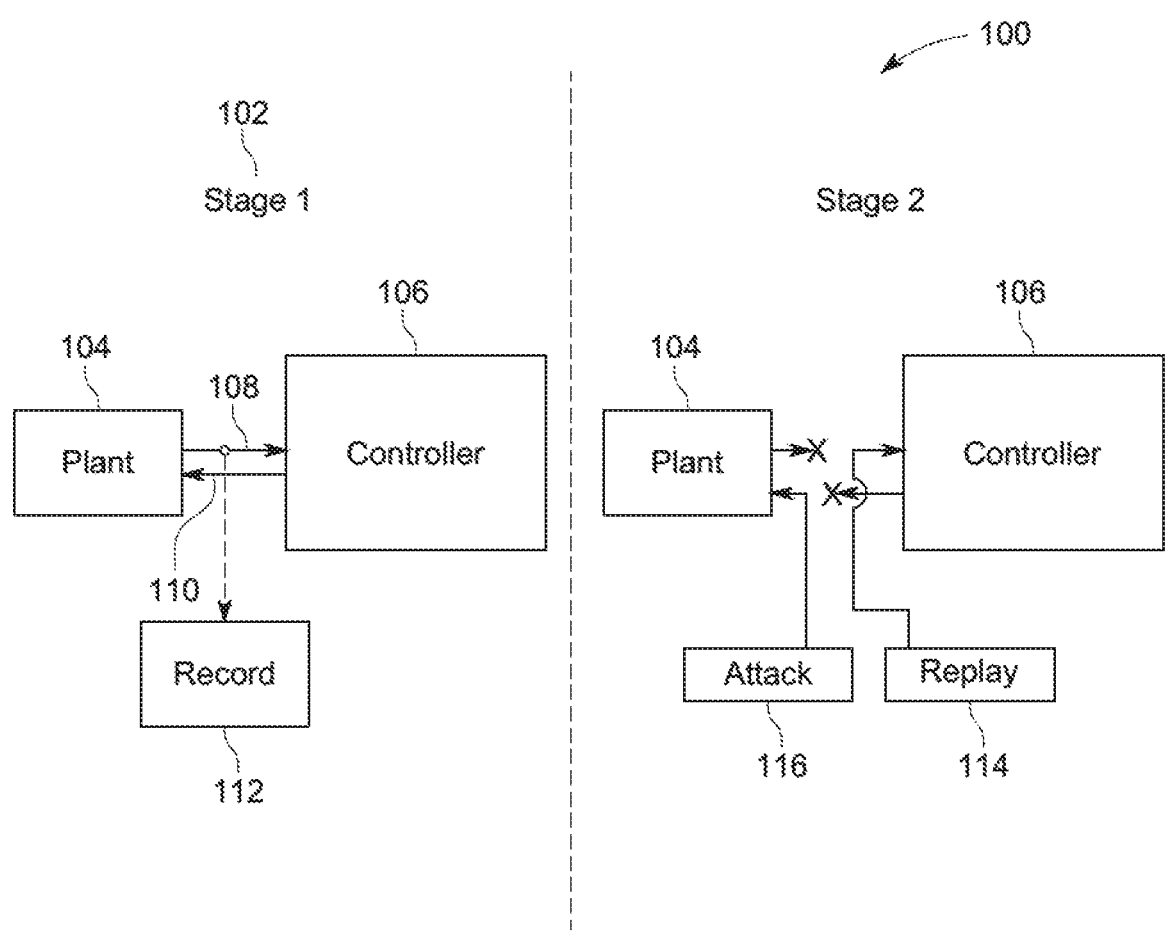
FIG. 1 is a high-level architecture of a system illustrating an example of a conventional multi-stage replay attack.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments described herein may provide a system and method for non-intrusive replay attack detection in an industrial control system or an enterprise asset without requiring injection of a signal into the control system. When a replay attack occurs, the attacker tends to hijack all sensors in one input/output (I/O) module. Modularized power generation systems, such as fuel cells, wind farms, and battery storage, tend to have hierarchical nodes in which multiple subsystems connect to one unit, while multiple units connect to one site controller, multiple site controllers connect to a regional controller, and multiple regional controllers connect to a master controller. Some embodiments exploit shared information and correlation among nodes in different modular subsystems to detect a replay attack including, for example, one or more of: (1) environmental information (e.g., hardened ambient temperature, pressure, and/or humidity) and its correlation with nodes at a different system; and (2) an ambient condition estimator and its correlation with nodes at different subsystems or units. For both (1) and (2), in some embodiments the normal behavior (e.g., correlation) between a secure ambient condition (e.g., temperature) and pre-selected ambient sensitive nodes may be built and saved as a decision boundary (e.g., for a classifier) or subspace (e.g., in a PCA approach). In some embodiments, the correlation may serve as a global feature for the replay attack. In some embodiments, the replay attack signal will be triggered if any aforementioned ambient condition related global feature goes beyond a threshold. In some embodiments, the attack detection accuracy can be enhanced by leveraging multiple cooperative attack detectors at different levels in the hierarchical system.

Some embodiments described herein are associated with time series data from one or more monitoring nodes from a physical (i.e., industrial or enterprise) asset and provides reliable replay attack detection. Monitoring nodes may include, for example, sensors, actuators, and/or controller nodes. The system may extract features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. The type and number of features for each monitoring node might be optimized using domain-knowledge and/or a feature discovery process. The features may be, for example, calculated over a sliding window with consecutive samples of specified duration from time series data. The length of the window and the duration of overlap for each batch may be determined from domain knowledge and an inspection of the data or using batch processing. The features may be computed at the local level (associated with each monitoring node) and/or the global level (associated with all the monitoring nodes, i.e., the whole asset). The time-domain values of the nodes or their extracted features may be, according to some embodiments, normalized for better numerical conditioning.

FIG. 1 is a high-level architecture of a system 100 illustrating an example of a conventional multi-stage replay attack. In the illustrated example, a plant 104 including one or more associated monitoring node sensors is in communication with a controller 106. During normal operation, the controller 106 receives sensor data 108 from the plant 104 associated with the one or more monitoring node sensors, and sends control data 110 to the plant 104 including instructions to control one or more components and/or systems of the plant 104.

In a first stage 102 of a replay attack, an attacker hijacks the monitoring node sensors, and observes and records the sensor readings within the sensor data 108 for a period of time during a recording operation 110. In a second stage 104 of the replay attack, the attacker repeats the recorded data to the controller 106 during a replay operation 114. while carrying out an attack 116 on the control inputs of the plant 104 instructing a component or system of the plant 104 to perform an operation such as changing an actuator. To evade detection, the attacker replays the previous sensor measurements to the controller 106. The previous sensor measurements are statistically identical to true outputs at steady state of the plant 104. As a result, an operator associated with the controller 104 is unaware that an attack is being performed on the plant 104. Furthermore, unlike a false-data injection attack, the attacker requires no knowledge of the system model of the plant 104 to generate stealthy outputs. Because the attacker hijacks all sensors, resilient control cannot stabilize the system.

Figure 2:
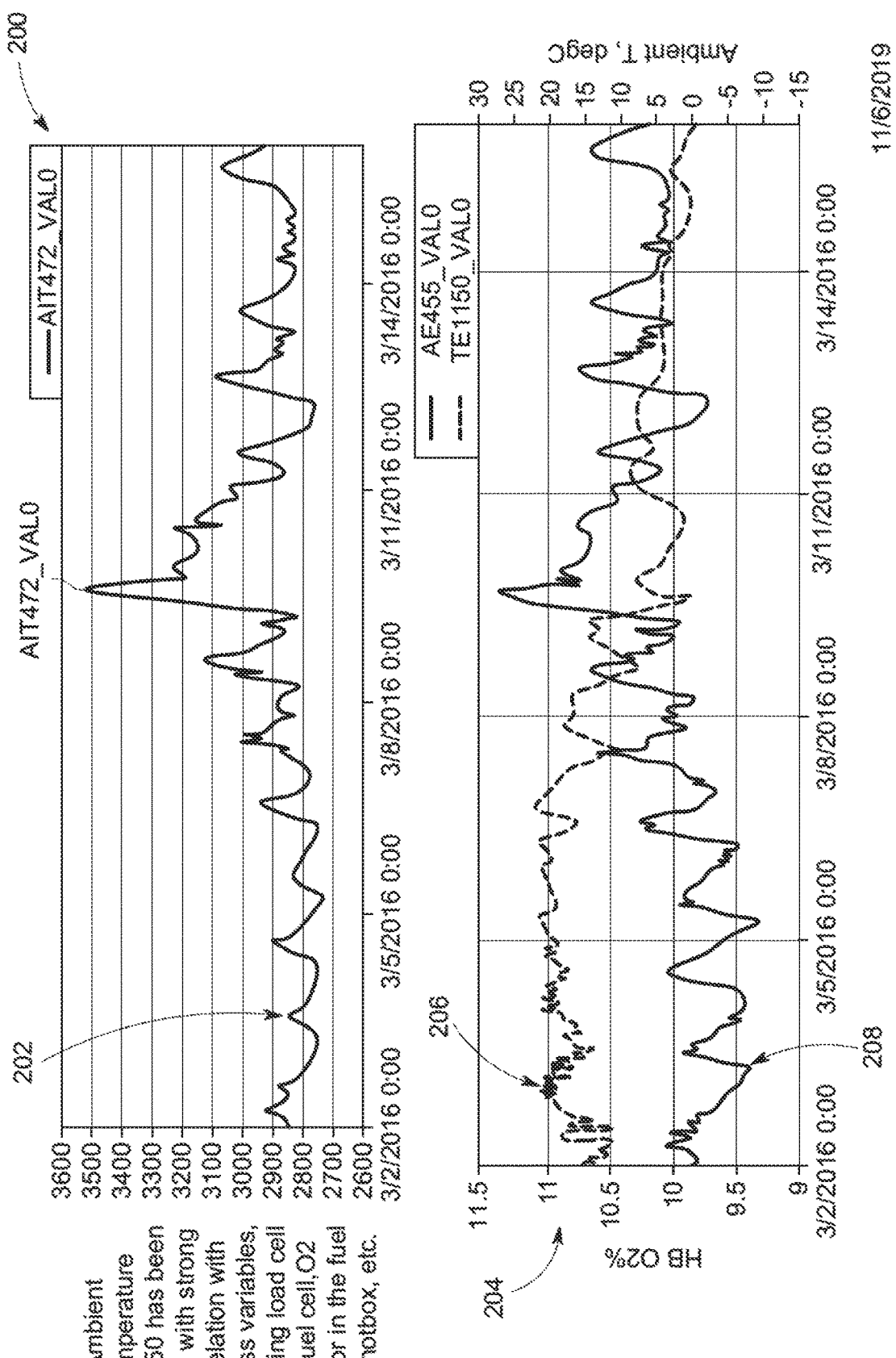
FIG. 2 illustrates an example of a correlation between fuel cell node process variable measurements and ambient temperature.

FIG. 2 illustrates an example of a correlation between fuel cell node process variable measurements and ambient temperature. FIG. 2 includes a first graph 200 including a load cell measurement 202 at a first location, an oxygen percentage measurement (O2%) 206 at a second location, and an ambient temperature measurement (degrees C.) 208 at a third location over a time period. the first and second location may be inside the fuel cell enclosure, while the third location may be outside of the fuel cell enclosure. The measurement 202 and 206 may be called process variables, while the measurement 208 may be called ambient variables. Examples of process variables for the fuel cell may include, but are not limited to load cell measurements for the fuel cell, oxygen sensor measurements in the fuel cell hotbox, temperature measurement in the fuel cell hotbox, a fuel flow valve position sensor associated with a flowrate control, an air-inlet vane opening position sensor, or an air blower speed sensor in the fuel cell enclosure, etc. As shown in FIG. 2, ambient temperature has been found to have a strong correlation with certain process variables. One or more embodiments described herein exploit the correlation among measurements among the nodes in different modular subsystems to detect replay attacks.

For example, in some embodiments, one or more of: (1) environmental information (e.g., hardened ambient temperature, pressure, and/or humidity) and its correlation with nodes at a different system; and (2) an ambient condition estimator and its correlation with nodes at different subsystems or units is used to detect replay attacks. In some embodiments the normal behavior (e.g., correlation) between a secure ambient condition (e.g., temperature) and pre-selected ambient sensitive nodes may be built and saved as a decision boundary or subspace for use in replay attack detection. In some embodiments, the correlation may serve as a global feature for the replay attack. In some embodiments, the replay attack signal is triggered if any aforementioned ambient condition related global feature goes beyond a predefined threshold. In some embodiments, the attack detection accuracy is enhanced by leveraging multiple cooperative attack detectors at different levels in a hierarchical system.

Figure 3:
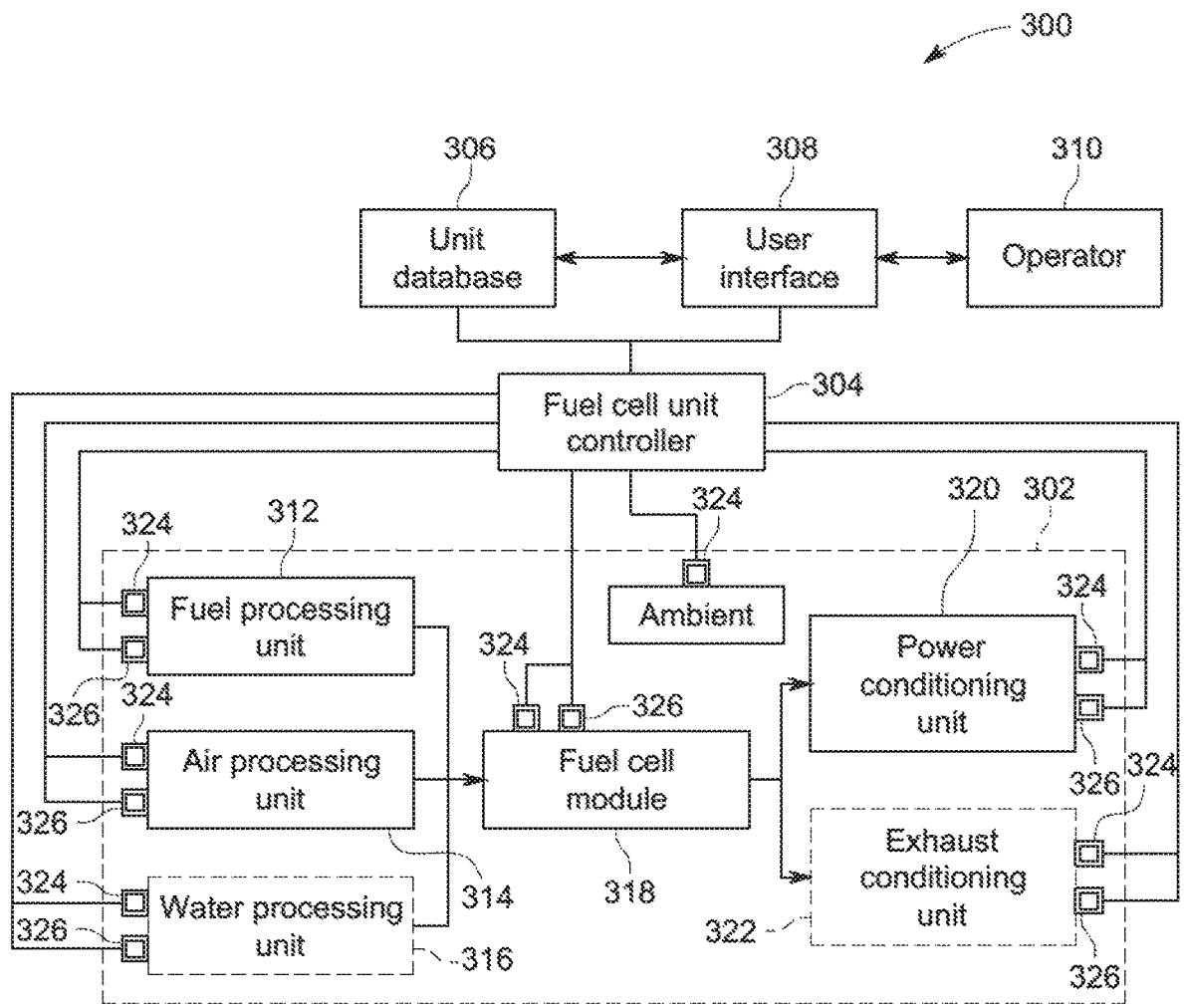
FIG. 3 is a high-level block diagram of a system that may be provided in accordance with some embodiments.

FIG. 3 is a high-level block diagram of a system 300 that may be provided in accordance with some embodiments. The system 300 illustrates a single fuel cell unit 302 is configured to implement a fuel cell process and includes a fuel cell unit controller 304, a unit database 306, and a user interface 308. The user interface 308 is configured to allow an operator 310 to monitor and control the fuel cell unit 302 via the fuel cell unit controller 304. The fuel cell unit 302 includes a fuel processing unit 312, an air processing unit 314, a water processing unit 316, a fuel cell module 318, a power conditioning module 320, an exhaust conditioning module 322, and instrumentation nodes 324. The instrumentation nodes 324 may include one or more sensors, for example, temperature sensors, pressure sensors, and humidity sensors. Temperature sensors may monitor parameters such as ambient temperature, fuel inlet and exhaust temperature, air inlet and exhaust temperature, steam temperature, fuel cell box temperature and fuel cell body temperature. Pressure sensors may monitor ambient pressure, fuel inlet and exhaust pressure, air inlet and exhaust pressure, steam pressure, fuel cell box pressure, and fuel cell inlet and outlet pressure. Humidity sensors, such as wet and dry bulb thermometers, may measure ambient humidity in an inlet duct of an air compressor. The sensors of instrumentation nodes 324 may also include flow sensors, speed sensors, flame detector sensors, valve position sensors, differential pressure sensors and other sensors that are typically used to measure various operating parameters and conditions relative to the operation of the fuel cell unit 302. In a particular embodiment, each instrumentation node 310 may be a standalone distributed I/O module.

The system 300 also includes several actuators 326 to mechanically controls the operation of the fuel cell unit 302. The actuators 326 may include electro-mechanical devices having variable setpoints or settings that allow the manipulation of certain process inputs (i.e., manipulated variables) for the control of process outputs (i.e., controlled variables) in accordance with a desired result or mode of operation. For example, commands generated by the fuel cell unit controller 304 may cause one or more actuators 326 to adjust valves between the fuel supply and fuel cell that regulate the flow level, fuel splits, and/or type of fuel being combustor. As another example, commands generated by fuel cell unit controller 304 may cause one or more actuators 326 to adjust an air blower speed or air inlet valve.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

Figure 4:
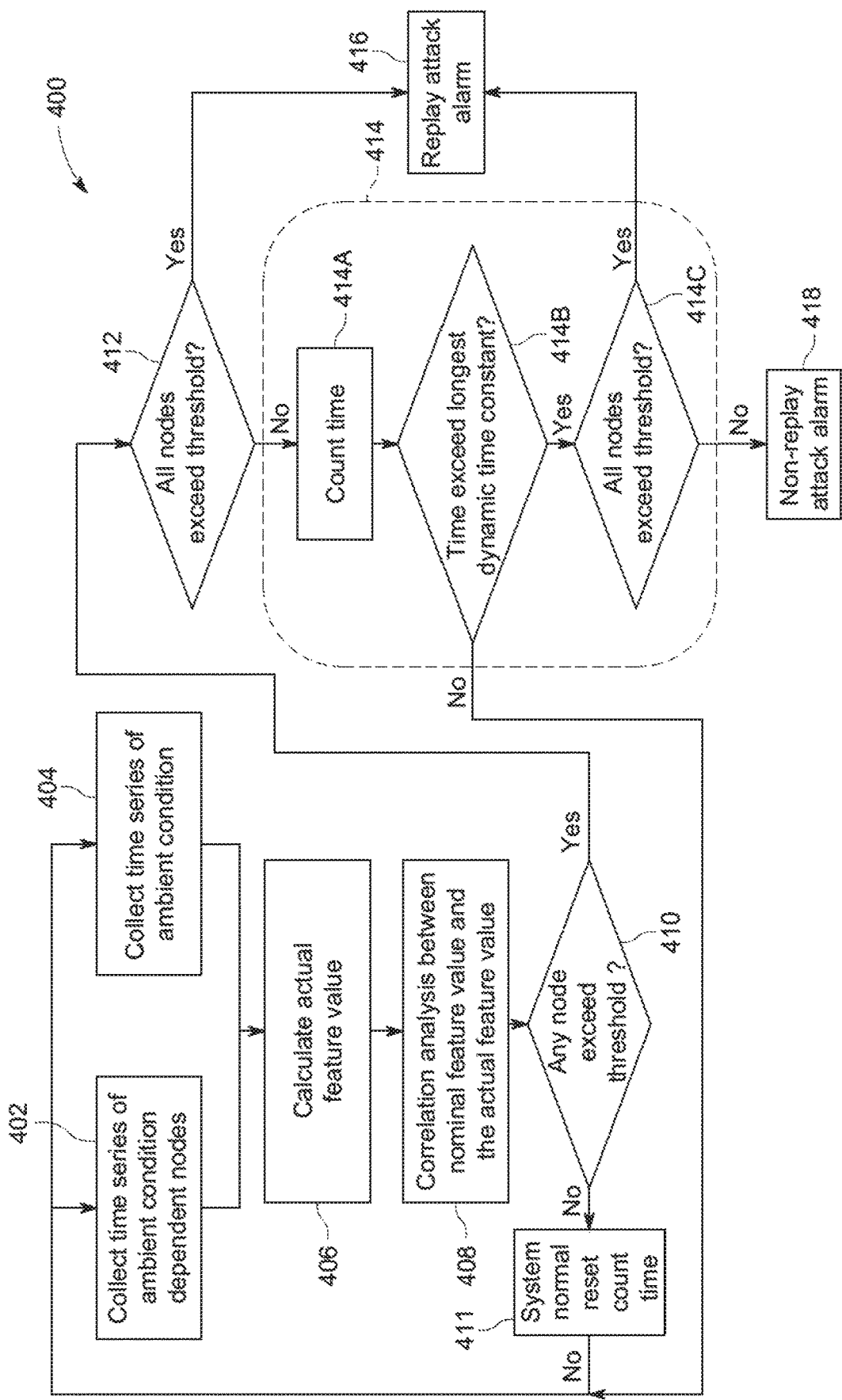
FIG. 4 is simplified flowchart of a replay attack detection method in accordance with some embodiments.

FIG. 4 is simplified flowchart 400 of a replay attack detection method in accordance with some embodiments. The flowcharts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

In some embodiments, the replay attack detection method may be implemented in the system of FIG. 3. At 402, the system collects time series data for one or more ambient condition dependent nodes and initializes a process delay timer. In particular embodiments, the ambient condition dependent nodes are determined based on operating historical data for each power system. Taking ambient temperature, for example, the nodes may be sensor nodes such as sensors for a load cell for a fuel cell, an 02 sensor in a fuel cell hotbox, an air conditioner switching frequency in the battery box, etc. The nodes may also include actuator nodes such as fuel flow valve position given a constant flowrate control, an air inlet vane opening position or an air blower speed value given a constant air flowrate control, etc. At 404, the system collects time series data for an ambient condition. In one example, a public temperature service system, such as provided by the National Oceanic and Atmospheric Administration (NOAA) which has both current future temperature series data is used as source of time-series data for the ambient condition. In another example, hardened ambient sensors, such as a hardened temperature sensor, are used as a source of the ambient condition time-series data. In yet another example, the system uses an in-house developed temperature estimation or other ambient condition estimation model for the local site. In particular embodiments, the temperature estimation model may use a response surfaces model, radial basis function, support vector machines, AutoRegressive Moving Average time series with eXogenous inputs (ARMAX) model and artificial neural networks. An artificial neural networks model such as a shallow feedforward neural networks, deep feedforward neural networks, recurrent neural networks and Long Short-Term Memory, can be used. As another example, multiple neural networks forming a neural network ensemble may also be used. In another example, the above examples can also be combined to provide a redundant and more reliable ambient condition reference.

At 406, the system calculates an actual feature value based on the time series data for the ambient condition dependent nodes determined at 402. In particular embodiments, the actual feature can be the raw time series data for the ambient condition dependent nodes, or a calculated equivalent ambient condition (e.g., temperature) value based on the dependent nodes values. At 408, the system conducts a correlation analysis between the calculated actual feature value and a nominal feature value. In some embodiments, the nominal feature value may be the ambient temperature value obtained from step 404. In some embodiments, the correlation analysis may conduct a similarity calculation between the two time series data to determine a similarity index value for one or more nodes in which the similarity index value is indicative of a measure of similarity between the calculated actual feature value and a nominal feature value. In particular embodiments, higher values of the similarity index are indicative of a greater similarity, and lower values of the similarity index are representative of a lesser similarity. In a particular embodiment, the correlation analysis is performed using a suitable correlation technique such as Dynamic Time Warping (DTW), Cross-Correlation, Manhattan Distance, short time series distance, cosine value, etc. In another embodiment, the correlation analysis may utilize Principle Component Analysis on moving window data, including the time series of calculated actual feature and the nominal feature values. In yet another embodiment, the correlation analysis may utilize a pretrained decision boundary with separate zones including normal, replay attack, and non-replay attack zones.

In 410, the system determines if the similarity index value for any nodes exceeds a predetermined threshold value. If the similarity index value for a nodes does not exceed the predetermined threshold value, in 412 the system determines that the system is operating normally, resets the count time for the process delay timer, and returns to 402 and 404. If the similarity index value for any node exceeds the predetermined threshold, the method continues to 412 in which the system determines if all nodes exceed the threshold value. If all nodes are not determined to exceed the threshold value, the method continues to 414. If all nodes exceed the threshold value, the method continues to 416. In 416, the system determines that that a replay attack is occurring and triggers a replay attack alarm indicative of the replay attack. Accordingly, if all nodes (or channels) exhibit the same abnormal behavior, a replay attack is indicated. According to some embodiments, information about detected threats may be transmitted back to an industrial asset control system.

In 414, the system considers the process delay for one or more ambient temperature related nodes, such as a metal body temperature in the fuel cell or a room temperature in a battery box, during sub-steps 414A-414C. In 414A, the system determines a count time of the process delay timer. In 414B, the system determines if the count time exceeds a preconfigured longest dynamic time constant. If the count time is determined to not exceed the longest dynamic time constant, the method returns to 402 and 404. If the count time is determined to exceed the longest dynamic time constant, the method continues to 414C in which the system determines if all nodes exceed the threshold value. If it is determined that not all nodes exceed the threshold value, the method continues to 418 in which the system determines that a non-replay attack is occurring and triggers an alarm indicative of the non-replay attack. If it is determined that all nodes exceed the threshold value, the method continues to 416 in which the system determines that a replay attack is occurring and triggers a replay attack alarm indicative of the replay attack.

Figure 5:
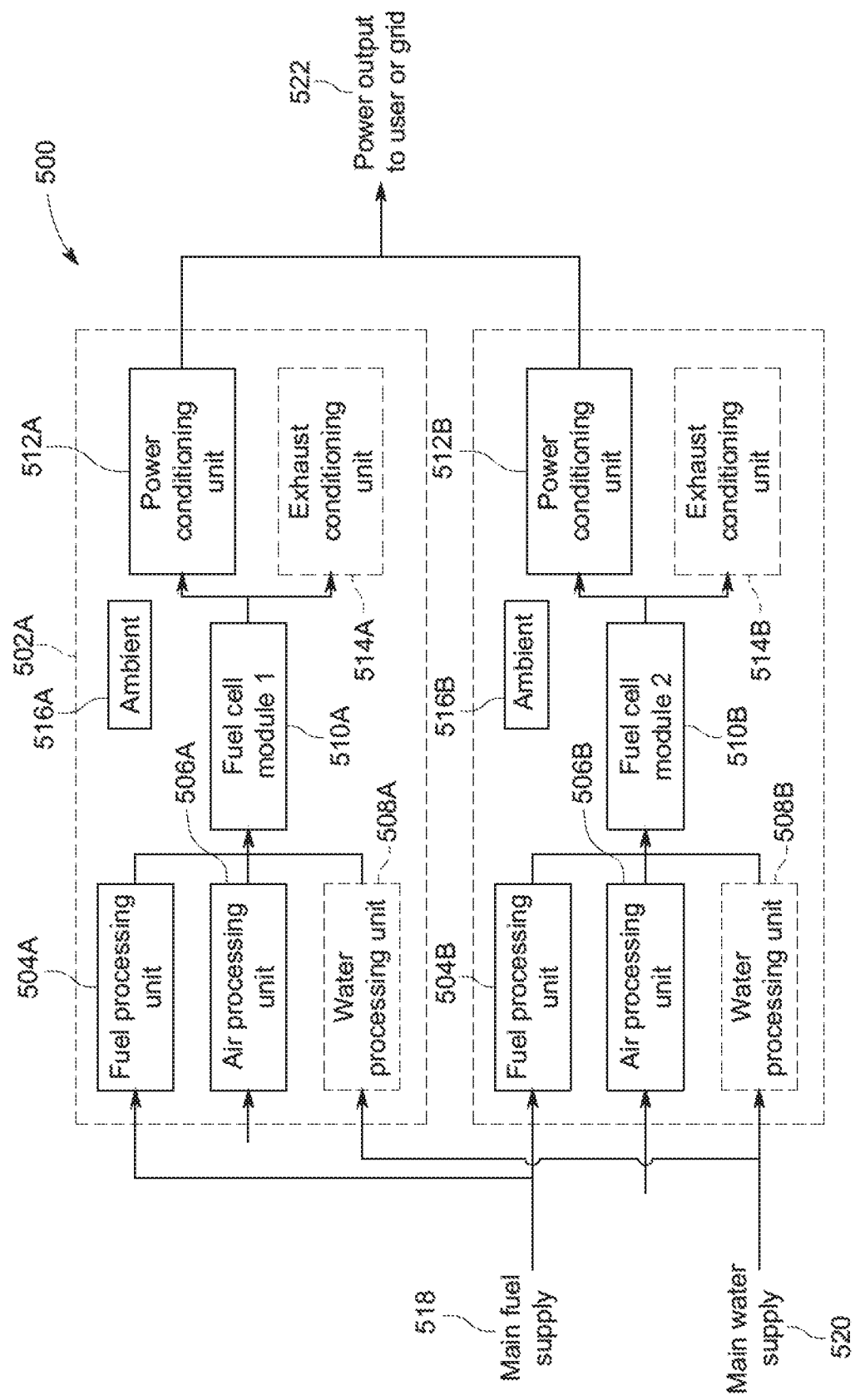
FIG. 5 is a high-level block diagram of another system that may be provided in accordance with some embodiments.

FIG. 5 is a high-level block diagram of another system 500 that may be provided in accordance with some embodiments. The system 500 includes a first fuel cell unit 502A and a second fuel cell unit 502B configured to work together to deliver power output to a user or grid. The first fuel cell unit 502A includes a first fuel processing unit 504A, a first air processing unit 506A, and a first water processing unit 508A coupled to a first fuel cell module 510A. The first fuel cell module 510A is further coupled to a first power conditioning unit 512A, and a first exhaust conditioning unit 514A. The second fuel cell unit 502B includes a second fuel processing unit 504B, a second air processing unit 506B, and a second water processing unit 508B coupled to a second fuel cell module 510B. The second fuel cell module 510B is further coupled to a second power conditioning unit 512B, and a second exhaust conditioning unit 514B. The first fuel cell unit 502A includes one or more ambient condition sensors 516A, and the second fuel cell unit 502B includes one or more ambient condition sensors 516B.

The first fuel processing unit 504A of the first fuel cell unit 502A and the second fuel processing unit 504A are coupled to a main fuel supply 518. The first water processing unit 508A of the first fuel cell unit 502A and the second water processing unit 508B of the second fuel cell unit 502B are coupled to a main water supply 520. The first power conditioning unit 512A of the first fuel cell unit 502A and the second power conditioning unit 512B of the second fuel cell unit 502B are coupled to together to provide a power output 522 to a user and/or power grid.

The system 500 may also include actuators to mechanically control the operation of the first fuel cell unit 502A and the second fuel cell unit 502B. The actuators may include electro-mechanical devices having variable setpoints or settings that allow the manipulation of certain process inputs (i.e., manipulated variables) for the control of process outputs (i.e., controlled variables) in accordance with a desired result or mode of operation.

Figure 6:
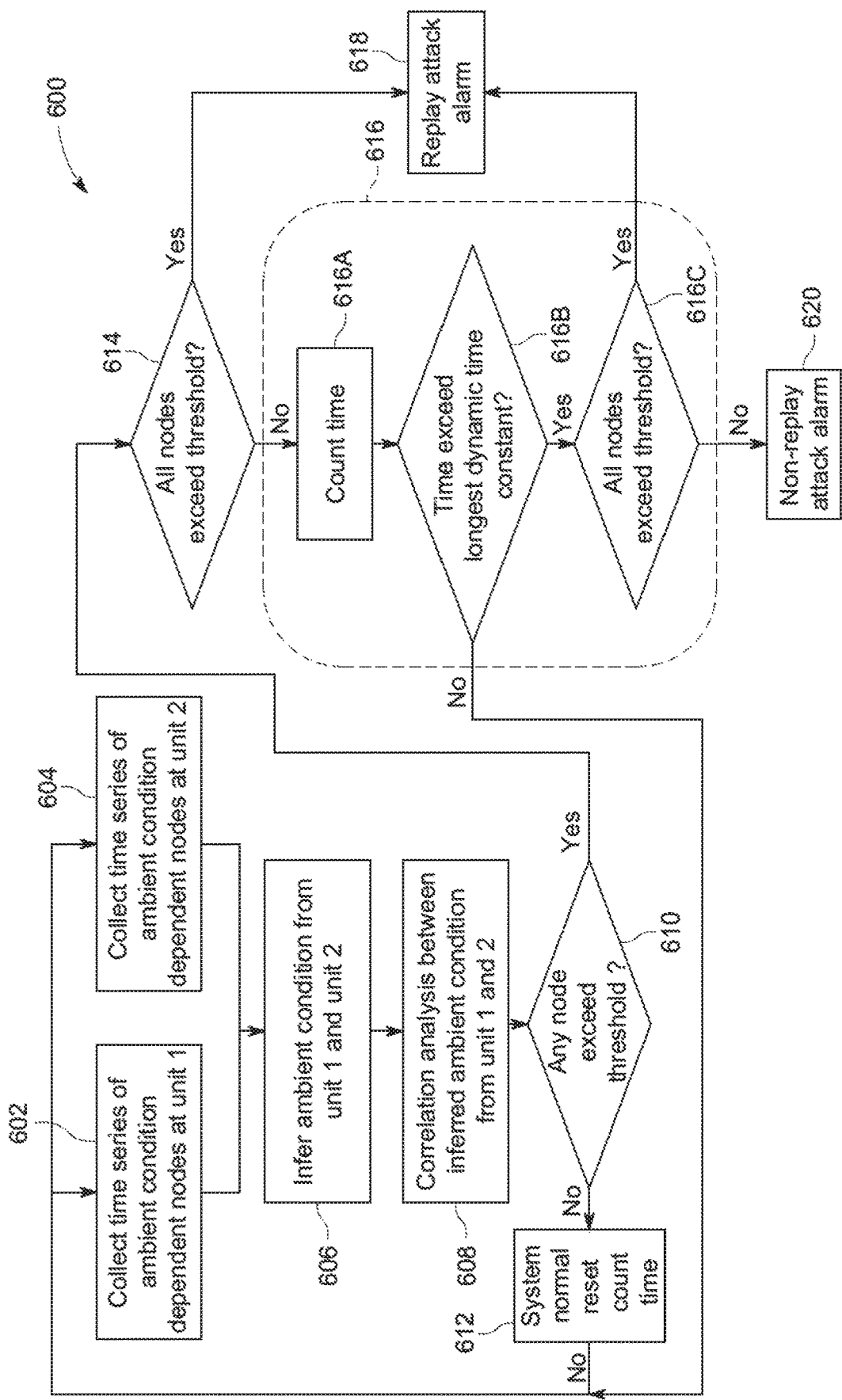
FIG. 6 is simplified flowchart of a replay attack detection method for multiple units collocated at a single site in accordance with some embodiments.

FIG. 6 is simplified flowchart 600 of a replay attack detection method for multiple units collocated at a single site in accordance with some embodiments. In some embodiments, the replay attack detection method may be implemented in the system of FIG. 5. At 602, the system collects first time series data for one or more ambient condition dependent nodes associated with a first unit located at a site and initializes a process delay timer. In particular embodiments, the ambient condition dependent nodes are determined based on operating historical data for each power system. Taking ambient temperature, for example, the nodes may be sensor nodes such as sensors for a load cell for a fuel cell, an 02 sensor in a fuel cell hotbox, an air conditioner switching frequency in the battery box, etc. The nodes may also include actuator nodes such as fuel flow valve position given a constant flowrate control, an air inlet vane opening position or an air blower speed value given a constant air flowrate control, etc. At 604, the system collects second time series data for one or more ambient condition dependent nodes associated with a second unit located at the site.

In 606, the system calculates a first inferred ambient condition based upon the first time series data for the first unit, and a second inferred ambient condition based upon the second time series data for the second unit. In 608, the system conducts a correlation analysis between the first inferred ambient condition and the second inferred ambient condition to determine a similarity index value.

In 610, the system determines if the similarity index value for any nodes exceeds a predetermined threshold value. If the similarity index value for a nodes does not exceed the predetermined threshold value, in 612 the system determines that the system is operating normally, resets the count time for the process delay timer, and returns to 602 and 604. If the similarity index value for any node exceeds the predetermined threshold, the method continues to 614 in which the system determines if all nodes exceed the threshold value. If all nodes are not determined to exceed the threshold value, the method continues to 616. If all nodes exceed the threshold value, the method continues to 618. In 618, the system determines that determines that a replay attack is occurring and triggers a replay attack alarm indicative of the replay attack. Accordingly, if all nodes (or channels) exhibit the same abnormal behavior, a replay attack is indicated.

In 616, the system considers the process delay for one or more ambient temperature related nodes during sub-steps 616A-616C. In 616A, the system determines a count time of the process delay timer. In 616B, the system determines if the count time exceeds a preconfigured longest dynamic time constant. If the count time is determined to not exceed the longest dynamic time constant, the method returns to 602 and 604. If the count time is determined to exceed the longest dynamic time constant, the method continues to 616C in which the system determines if all nodes exceed the threshold value. If it is determined that not all nodes exceed the threshold value, the method continues to 620 in which the system determines that a non-replay attack is occurring and triggers an alarm indicative of the non-replay attack. If it is determined that all nodes exceed the threshold value, the method continues to 618 in which the system determines that a replay attack is occurring and triggers a replay attack alarm indicative of the replay attack.

Figure 7:
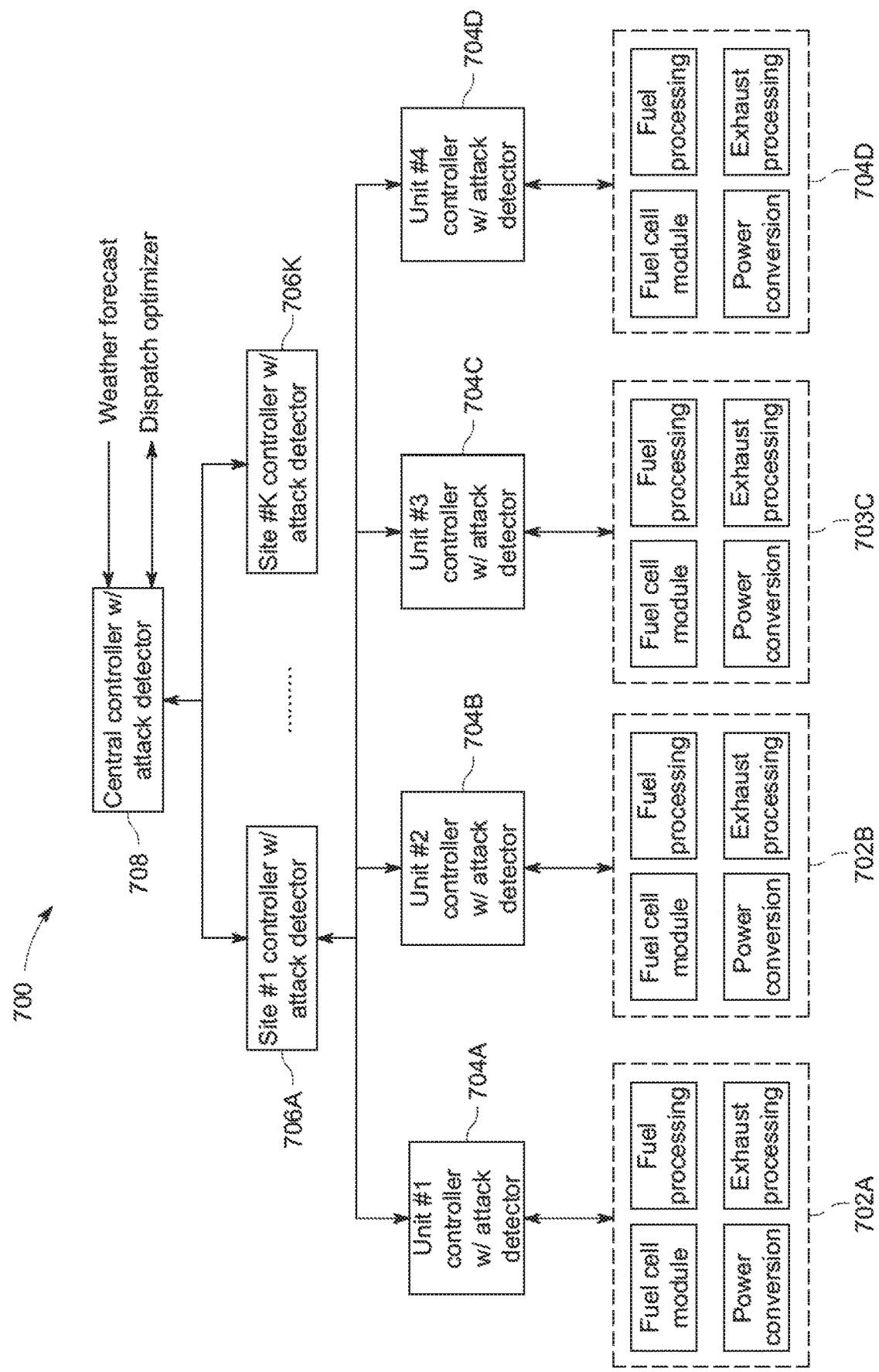
FIG. 7 is a high-level block diagram of a replay attack detection system for a hierarchical control structure that may be provided in accordance with some embodiments.

FIG. 7 is a high-level block diagram of a replay attack detection system 700 for a hierarchical control structure that may be provided in accordance with some embodiments. The replay attack detection system includes a plurality of fuel cell units 702A-702D each in communication with a corresponding unit controller 704A-704D. Each fuel cell unit 702A-702D includes a fuel cell module, a fuel processing module, a power conversion module, and an exhaust processing module. Each of the unit controllers is in communication with a first site controller 706A of a plurality of site controllers 706A-706K. Each of the plurality of site controllers 706A-706K is further communication with a central controller 708.

A first layer in the hierarchical control structure is distributed I/O at the module level (e.g., fuel cell, fuel processing, power conversion, and exhaust processing) within each fuel unit 702A-702D, and a second layer is the unit controller 704A-704D which manages the module level I/O. The third layer in the hierarchical control structure includes the site controller 706A which oversees multiple unit controllers 704A-704D at one installation site, such as a data center or commercial building. The site controller 706A-706K may determine the optimal power schedules for multiple units at local site to achieve a Power Purchase Agreement (PPA) while also receiving information from the central controller 708 for other high priority demands. The central controller 708 is operated by the system operator which oversees the fleet with life-cycle management including production, scheduling, maintenance, replacement and recycle operations. In certain embodiments, the central controller 708 may be a regional controller configured to control site controllers within a particular geographic region. The central controller 708 is configured to receive local weather measurement and forecast information, and communicate with a dispatch optimizer. One or more of the unit controllers 704A-704D and the site controllers 706A-706K may be configured to access the local weather measurement and forecast such as temperature, pressure, humidity.

In the embodiment illustrated in FIG. 7, each of the unit controllers 704A-704D, the site controllers 706A-706K, and the central controller 708 are configured with a replay attack detector such as described herein with respect to some embodiments. In some embodiments, the ambient condition based approach to replay attack detection described with respect to FIGS. 3 and 4 is implemented in each of the unit controllers 704A-704D, the site controllers 706A-706K, and the central controller 708 so as to implement the ambient condition based approach in all levels of the hierarchical control structure. In such embodiments, the attack detector at the unit controller 704A monitors for the occurrence of a replay attack at the subunit or module level (e.g., fuel cell module, fuel processing module, power conversion module, or exhaust processing module) within the fuel unit 702A. For situations having attack coverage less than 100% in which not all modules are under attack, a temporal-spatial correlation among different modules within one unit can be exploited, such using as PCA-based approach, to detect a replay attack on a module. However, for situations in which all four modules of the fuel unit 702A are hijacked, the attack detection approach described with respect to FIGS. 3 and 4 may be used in some embodiments.

In some embodiments, the site level attack detector within the site controller 706A monitors if any of the unit level controllers (e.g., unit controllers 704A-704D) have been fully hijacked with a replay attack by simply using the replay detection approach described with respect to FIGS. 3 and 4. In some other embodiments, the site controller 706A may monitor the unit controllers 704A-704D for a replay attack by exploiting the multiple unit located at the same site using the replay attack detection approach described with respect to FIGS. 5-6. In some embodiments, the central attack detector of the central controller 708 is responsible for detecting if a any of the site controllers 706A-706K are fully hijacked with a replay attack using the replay attack detection approach described with respect to FIGS. 3 and 4. Accordingly, the distributed/hierarchical nature of the control system is leveraged to reconcile against an ambient environment reading used to detect a replay attack on the control system.

In some embodiments, the first unit controller 704A is a hardened unit and is compared to all other unit controllers 704B-704D. For controller units deviating from first unit controller 704A having a deviation larger than a predefined threshold, such unit controllers are identified as an attacked unit.

Figure 8:
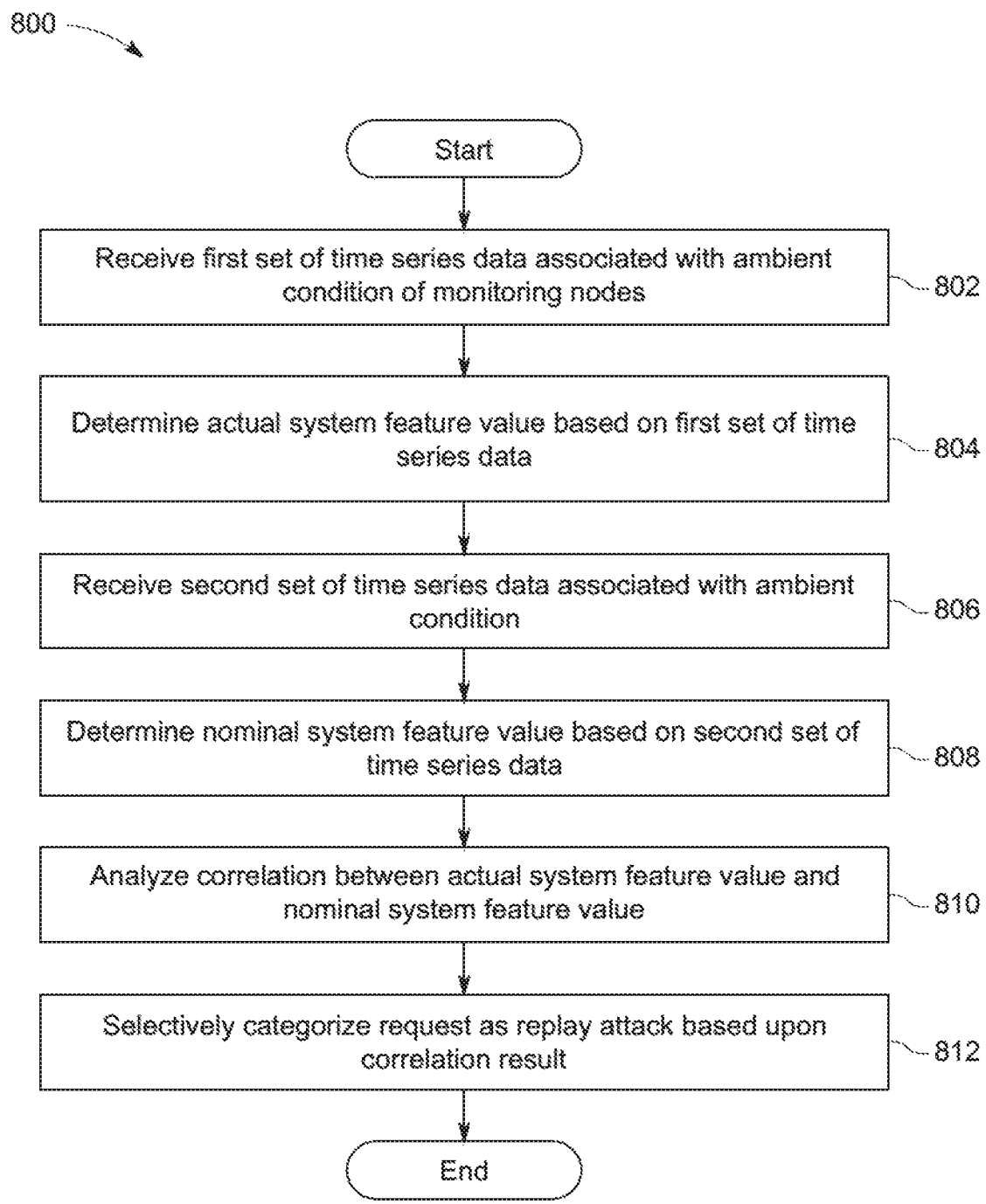
FIG. 8 is simplified flowchart of a replay attack detection method in accordance with some embodiments.

FIG. 8 is simplified flowchart 800 of a replay attack detection method in accordance with some embodiments. The method may be used to identify a replay attack in an industrial control system of an industrial asset. In 802, a system receives a first set of time series data associated with an ambient condition of one or more first monitoring nodes at a first location of the industrial control system. In 804, the system determines an actual system feature value for the industrial asset based upon the first set of time series data. In 806, the system receives a second set of time series data indicative of the ambient condition at a second location. At 808, the system determines a nominal system feature value based upon the second set of time series data.

In 810, the system analyzes a correlation between the actual feature value and the nominal system feature value to determine a correlation result. In 812, the system selectively categorizes a request received by the industrial control system as a replay attack based upon the correlation result.

In some embodiments, the second set of time series data is received from at least one of a public temperature service system, one or more hardened ambient sensors, or a temperature estimation model. In some embodiments, the second set of time series data is received from an ambient condition estimation model. In some embodiments, the ambient condition estimation model comprises one or more of an artificial neural network or autoregressive moving average time series with exogenous inputs (ARMAX) model.

In some embodiments, the actual system feature value is derived from raw time series data of the first set of time series data or a calculated equivalent based upon the first set of time series data. In some embodiments, the nominal system feature value is derived from measured values of the second set of time series data or calculated values of the second set of time series data. In some embodiments, analyzing the correlation includes calculating a similarity between the first set of time series data and the second set of time series data. In some embodiments, the similarity is calculated using one or more of a dynamic time warping (DTW), a cross-correlation Manhattan distance, a short time series distance, or a cosine value between the first set of time series data and the second set of time series data.

In some embodiments, the industrial control system is a modular control system for one or more of a fuel cell, a wind farm, or an energy storage system. In some embodiments, the one or more first monitoring nodes comprise at least one of a load cell for a fuel cell, an oxygen sensor in a fuel cell hotbox, an air conditioner switching frequency sensor associated with a battery box, a fuel flow valve position sensor associated with a flowrate control, an air-inlet vane opening position sensor, or an air blower speed sensor.

In some embodiments, the industrial control system is a hierarchical control system having a plurality of control layers. In some embodiments, the selectively categorizing is further based upon at least one of a percentage of corruption of the one or more monitoring nodes or an expected time for a change in the ambient condition to affect the one or more monitoring nodes.

In some embodiments, the industrial control system includes a plurality of the one or more first monitoring nodes located at a same geographical location having a substantially similar ambient condition In some embodiments, the ambient condition at the second location is inferred from one or more monitoring nodes in a plurality of units at the second location.

Figure 9:
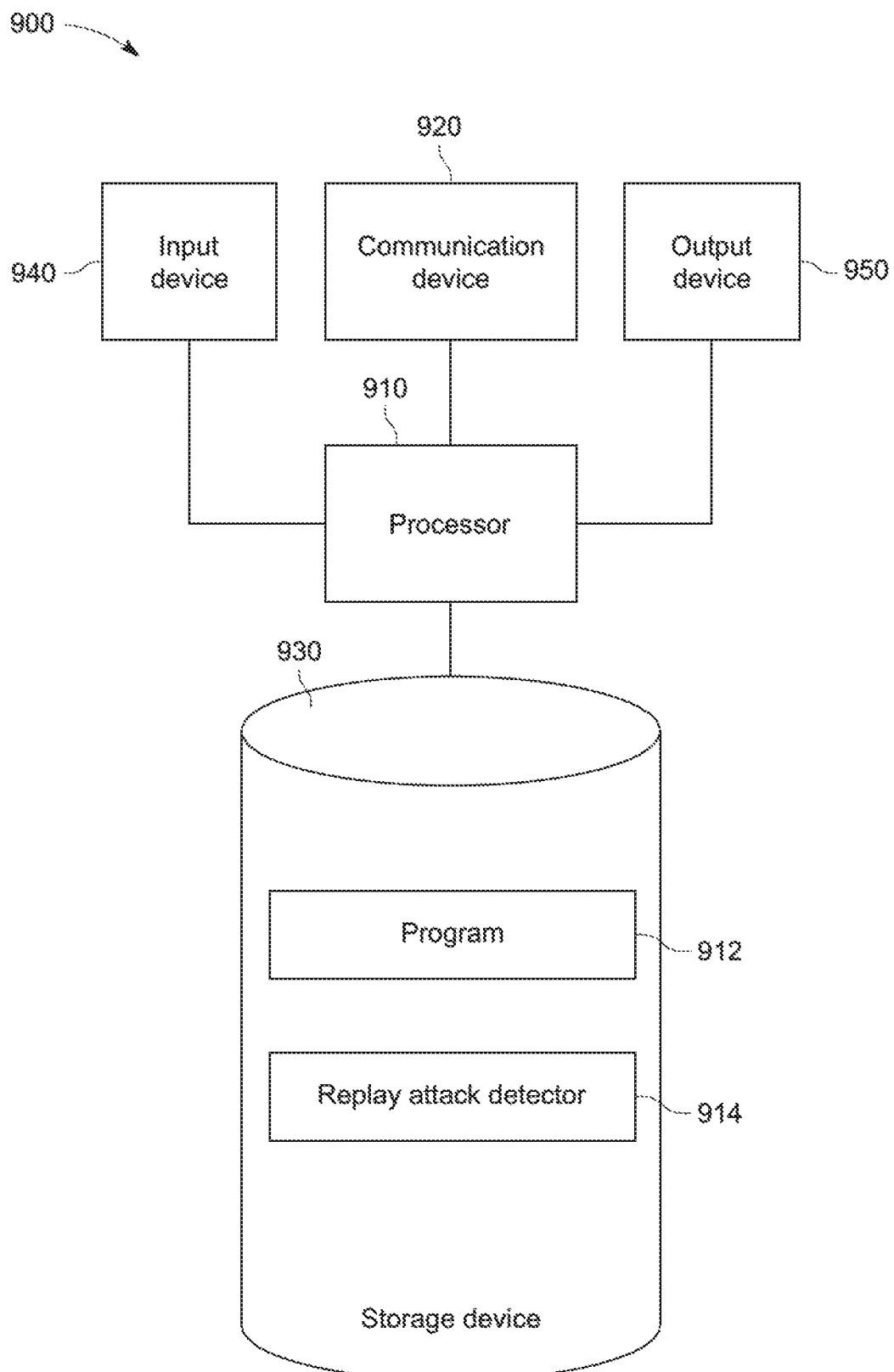
FIG. 9 is a replay attack detection platform according to some embodiments.

FIG. 9 is a block diagram of replay attack detection platform 900 for an industrial asset that may be, for example, associated with the system 300 of FIG. 1, the system 500 of FIG. 5, the system 700 of FIG. 7 and/or any other system described herein. The replay attack detection platform 900 comprises a processor 910, such as one or more commercially available Central Processing Units ("CPUs") in the form of one-chip microprocessors, coupled to a communication device 920 configured to communicate via a communication network (not shown in FIG. 9). The communication device 920 may be used to communicate, for example, with one or more remote monitoring nodes, user platforms, etc. The replay attack detection platform 900 further includes an input device 940 (e.g., a computer mouse and/or keyboard) and/an output device 950 (e.g., a computer monitor to render a display, provide alerts, transmit recommendations, and/or create reports). According to some embodiments, a mobile device, monitoring physical system, and/or PC may be used to exchange information with the replay attack detection platform 900.

The processor 910 also communicates with a storage device 930. The storage device 930 may comprise any appropriate information storage device, including combinations of magnetic storage devices (e.g., a hard disk drive), optical storage devices, mobile telephones, and/or semiconductor memory devices. The storage device 930 stores a program 912 and/or a replay attack detector 914 for controlling the processor 910. The processor 910 performs instructions of the programs 912, 914, and thereby operates in accordance with any of the embodiments described herein.

The programs 912, 914 may be stored in a compressed, uncompiled and/or encrypted format. The programs 912, 914 may furthermore include other program elements, such as an operating system, clipboard application, a database management system, and/or device drivers used by the processor 910 to interface with peripheral devices.

As used herein, information may be "received" by or "transmitted" to, for example: (i) the replay attack detection platform 900 from another device; or (ii) a software application or module within the replay attack detection platform 900 from another software application, module, or any other source.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data configurations have been described herein, note that any number of other configurations may be provided in accordance with embodiments of the present invention. For example, although some embodiments are focused on fuel cells, any of the embodiments described herein could be applied to other types of industrial assets including gas turbines, power grids, dams, locomotives, airplanes, and autonomous vehicles (including automobiles, trucks, drones, submarines, etc.).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. A method to identify a replay attack in an industrial control system of an industrial asset, comprising:
receiving a first set of time series data associated with an ambient condition of one or more first monitoring nodes at a first location within an enclosure of the industrial control system, the first set of time series data comprising first data values obtained during a particular time period;
determining an actual system feature value for the industrial asset based upon the first set of time series data;
receiving a second set of time series data indicative of the ambient condition at a second location external to the enclosure of the industrial control system, the second set of time series data comprising second data values obtained during the particular time period;
determining a nominal system feature value based upon the second set of time series data;
analyzing a correlation between the actual feature value and the nominal system feature value to determine a correlation result; and
selectively categorizing a request received by the industrial control system as a replay attack based upon the correlation result.

2. The method of claim 1, wherein the second set of time series data is received from at least one of a public temperature service system, one or more hardened ambient sensors, or a temperature estimation model.

3. The method of claim 1, wherein the second set of time series data is received from an ambient condition estimation model.

4. The method of claim 3, wherein the ambient condition estimation model comprises one or more of an artificial neural network or autoregressive moving average time series with exogenous inputs (ARMAX) model.

5. The method of claim 1, wherein the actual system feature value is derived from raw time series data of the first set of time series data or a calculated equivalent based upon the first set of time series data.

6. The method of claim 1, wherein the nominal system feature value is derived from measured values of the second set of time series data or calculated values of the second set of time series data.

7. The method of claim 1, wherein analyzing the correlation includes calculating a similarity between the first set of time series data and the second set of time series data.

8. The method of claim 7, wherein the similarity is calculated using one or more of a dynamic time warping (DTW), a cross-correlation Manhattan distance, a short time series distance, or a cosine value between the first set of time series data and the second set of time series data.

9. The method of claim 1, wherein the industrial control system is a modular control system for one or more of a fuel cell, a wind farm, or an energy storage system.

10. The method of claim 1, wherein the one or more first monitoring nodes comprise at least one of a load cell for a fuel cell, an oxygen sensor in a fuel cell hotbox, an air conditioner switching frequency sensor associated with an energy storage system, a fuel flow valve position sensor associated with a flowrate control, an air-inlet vane opening position sensor, or an air blower speed sensor, or a temperature sensor associated with a fuel cell system, or a temperature sensor associated with a wind farm system, or a temperature sensor associated with an energy storage system.

11. The method of claim 1, wherein the industrial control system is a hierarchical control system having a plurality of control layers.

12. The method of claim 1, wherein the selectively categorizing is further based upon at least one of a percentage of corruption of the one or more monitoring nodes or an expected time for a change in the ambient condition to affect the one or more monitoring nodes.

13. The method of claim 1, wherein the industrial control system includes a plurality of the one or more first monitoring nodes located at a same geographical location having a substantially similar ambient condition.

14. The method of claim 1, wherein the ambient condition at the second location is inferred from one or more monitoring nodes in a plurality of units at the second location.

15. A system to identify a replay attack in an industrial control system of an industrial asset, comprising:
one or more first monitoring nodes at a first location within an enclosure of the industrial control system; and
an attack detector, coupled to the one or more first monitoring nodes, configured to:
receive a first set of time series data associated with an ambient condition of one or more first monitoring nodes at the first location of the industrial control system, the first set of time series data comprising first data values obtained during a particular time period;
determine an actual system feature value for the industrial asset based upon the first set of time series data;
receive a second set of time series data indicative of the ambient condition at a second location external to the enclosure of the industrial control system, the second set of time series data comprising second data values obtained during the particular time period;
determine a nominal system feature value based upon the second set of time series data;
analyze a correlation between the actual feature value and the nominal system feature value to determine a correlation result; and
selectively categorize a request received by the industrial control system as a replay attack based upon the correlation result.

16. The system of claim 15, wherein the second set of time series data is received from at least one of a public temperature service system, one or more hardened ambient sensors, or a temperature estimation model.

17. The system of claim 15, wherein the second set of time series data is received from an ambient condition estimation model.

18. The system of claim 17, wherein the ambient condition estimation model comprises one or more of an artificial neural network or autoregressive moving average time series with exogenous inputs (ARMAX) model.

19. The system of claim 15, wherein the actual system feature value is derived from raw time series data of the first set of time series data or a calculated equivalent based upon the first set of time series data.

20. The system of claim 15, wherein the nominal system feature value is derived from measured values of the second set of time series data or calculated values of the second set of time series data.

* * * * *